H. M. GIFFIN.
CLUTCH MECHANISM.
APPLICATION FILED OCT. 20, 1917.
1,392,932. Patented Oct. 11, 1921.
2 SHEETS—SHEET 1.
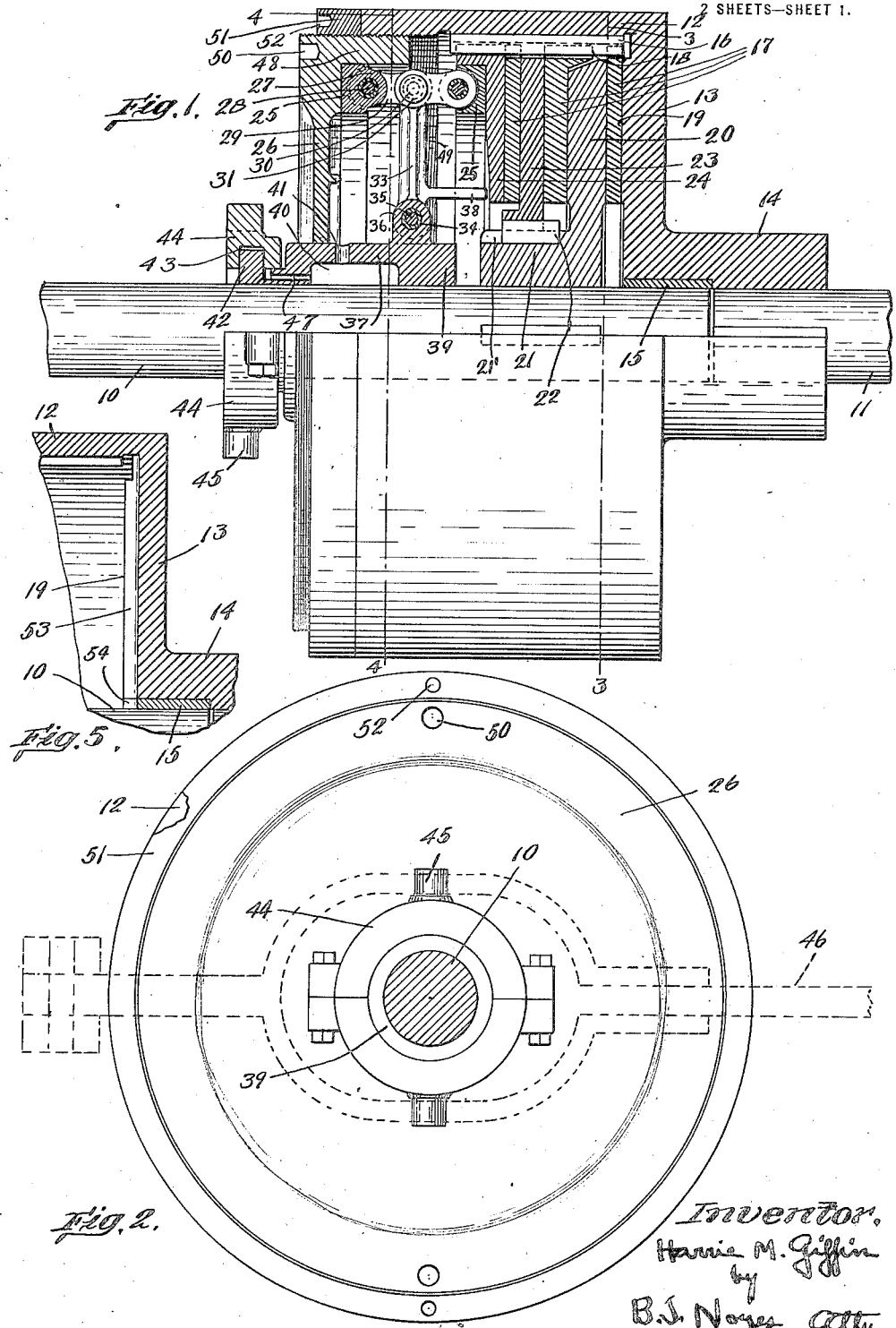

H. M. GIFFIN.
CLUTCH MECHANISM.
APPLICATION FILED OCT. 20, 1917.

1,392,932.

Patented Oct. 11, 1921.
2 SHEETS—SHEET 2.

Inventor,
Harrie M. Giffin
by
B. J. Noyes atty

UNITED STATES PATENT OFFICE.

HARRIE M. GIFFIN, OF BOSTON, MASSACHUSETTS.

CLUTCH MECHANISM.

1,392,932.　　　　　Specification of Letters Patent.　　Patented Oct. 11, 1921.

Application filed October 20, 1917. Serial No. 197,707.

*To all whom it may concern:*

Be it known that I, HARRIE M. GIFFIN, a citizen of the United States, and a resident of Forrest Hills, Boston, county of Suffolk, and State of Massachusetts, have invented an Improvement in Clutch Mechanism, of which the following is a specification.

My invention relates to clutching mechanism of the type in which a driving shaft is adapted to be connected through said clutching mechanism with a driven shaft, or with a pulley, whereby said shaft or pulley may be rotated with said driving shaft in the clutched condition of the mechanism, and whereby the driving shaft and the driven shaft or pulley are adapted for independent relative rotation in the unclutched condition of the mechanism.

With the clutch mechanism of the type specified, it is of importance that the entire clutching mechanism be inclosed in an inclosing case, whereby there are no projecting parts that may easily engage the clothing of an operator and thereby tend to cause injury to the operator, and whereby the entire mechanism may be immersed in a body of oil and thus be continually lubricated.

An object of my invention therefore is the provision of a clutching mechanism in which the disposition of the component parts thereof is such that they may be contained in an inclosing casing having a smooth exterior surface.

It has heretofore been common with such clutching mechanism that the operating links or levers are fixed to one of said shafts and consequently rotate therewith. In the unclutched condition of the mechanism these links rotate in the bath of oil in which the clutch plates are immersed, and consequently absorb a considerable amount of power through the churning of the oil.

A further object of my invention, therefore, is to provide means whereby the clutch operating links or levers are entirely independent of any revolving part of the clutching mechanism in the unclutched condition of said mechanism, whereby there may be no absorption of power due to the churning of the oil by the operating levers immersed therein.

The means whereby I accomplish this object of my invention is in the provision of two annular rings to which the operating levers are connected, and which operate between two relatively longitudinally movable parts of the clutch mechanism, and which in the operated condition of the mechanism, are forced into firm engagement with the relatively movable members, whereby the clutch is forced into engaging condition and which, in the unclutched condition of the mechanism, are free from any driving or driven element of the clutch and therefore are unconstrained in movement.

It is necessary to exert a considerable pressure between the clutch plates to maintain said plates in engaging position against relative movement, or slipping, and it is desirable that the clutch mechanism be moved into clutched or unclutched condition with a relatively slight amount of force exerted upon the clutch operating lever.

A still further object of my invention, therefore, is in the provision of a clutch operating mechanism or linkages so constructed and arranged that a comparatively slight force exerted upon the operating lever will exert a considerable pressure upon the clutch plates to maintain them in effective clutched condition.

The means whereby I attain this object of my invention is in the provision of a double toggle mechanism connected between the operating lever and the clutch plates.

Another object of my invention resides in the means whereby the bearings of the various parts of the mechanism are lubricated.

Figure 1 is a side elevation partly in section of the clutching mechanism embodying my invention.

Fig. 2 is an end view of Fig. 1.

Fig. 5 is a detail of the end wall of the casing, illustrating the oil ducts.

Figure 3:
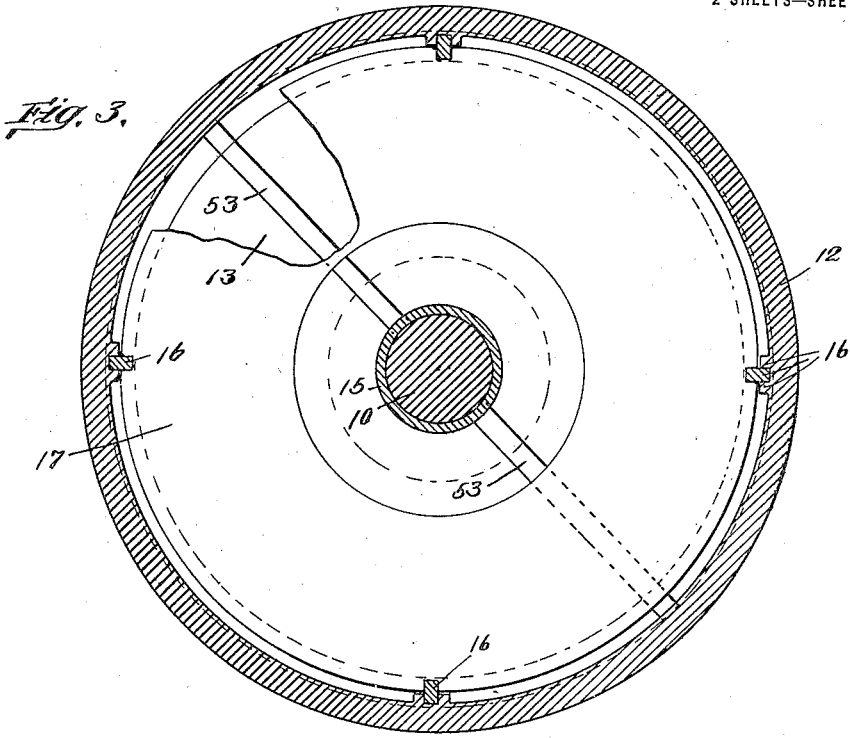
Fig. 3 is a sectional view along lines 3—3 of Fig. 1.
Figure 4:
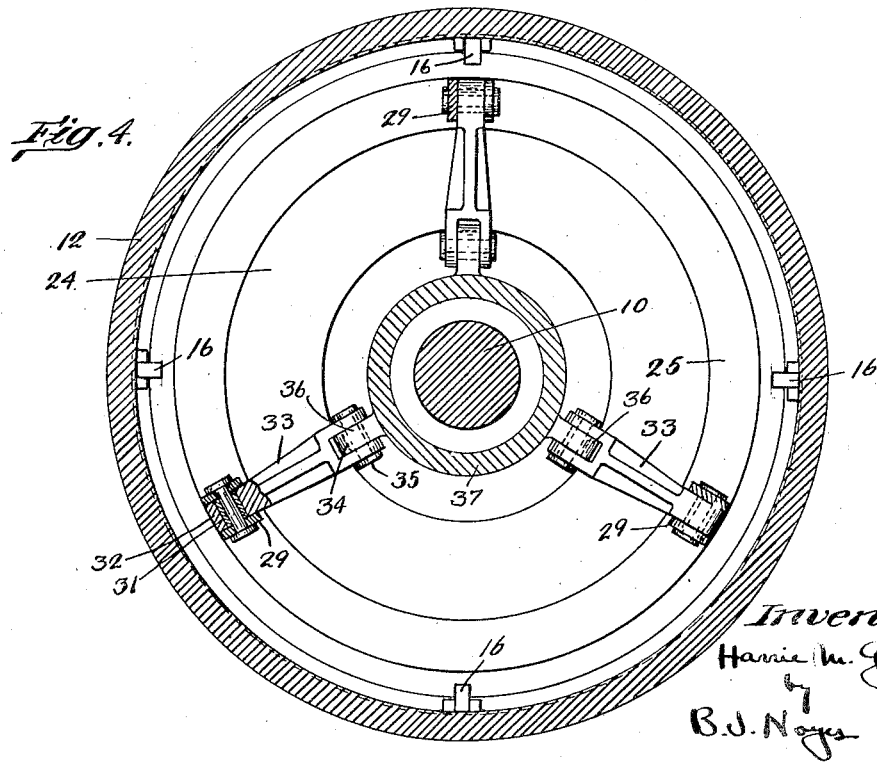
Fig. 4 is a view along lines 4—4 of Fig. 1.

As here shown, the clutching mechanism is arranged to connect the driving shaft 10 with the driven shaft 11, and includes a casing which may be formed with cylindrical portion 12 and a side or end wall 13, which is provided with a hub 14 in which the driven shaft 11 is keyed. A bushing 15 is concentrically arranged within said hub and forms a bearing in which the end of drive shaft 10, is arranged whereby said driving and driven shafts are maintained in axial alinement. The cylindrical portion 12 of the casing is interiorly provided with keys 16, which are slidably engaged by clutch plates 17. Certain of said clutch plates 17 are formed with enlarged slotted bearing surfaces 18 at their point of engagement with the keys 16 of the casing.

The end wall 13 is interiorly formed with a radial face 19, against which one of said clutch plates 17 is adapted to be pressed in the engaged condition of the clutch. As said clutch plate 17 adjacent the end wall is fixed to the casing against relative rotation therewith, and therefore against rotation relative to said end wall 13, there is no wear between the clutch plate and the end wall of the casing.

A clutch member having a radial flange 20 formed with oppositely disposed radial engaging faces and a concentrically arranged hub 21, is secured to the driving shaft 10 for rotation therewith. Said hub is formed with a spline way 21', in which is secured a key 22. A clutch plate 23 is slidably arranged on the hub 21 of the clutch member and secured against independent rotation therewith by means of said key 22. Said clutch plates and members 20 and 23 are alternately arranged with the clutch plates 17 secured to the clutch casing, whereby upon engagement of said plates the rotation of the driving shaft 10 will be transmitted through said plates to the driven shaft 11.

A pressure plate 24 is slidably arranged on the keys 16 of the casing, and is arranged to receive the pressure from the operating mechanism for transmission to the clutch plates. Since said member 24 and the contiguous clutch plate 17 are keyed against relative rotation to the clutch casing, said pressure plate and clutch plate may be considered, so far as the operation of the mechanism is concerned, as one clutch plate. The same is true of the clutch plate 17 adjacent the end wall 13, and said clutch plates 17 adjacent said pressure plate 24 and end wall 13 are for the purpose of receiving the wear that would otherwise be received by the pressure plate and the face 19 of the end wall.

The clutch operating mechanism includes two annular pressure floating rings 25, of which one is arranged, in the clutched condition of the mechanism, to bear against the pressure plate 24, and the other of which is arranged to bear against the adjustable end wall 26, hereinafter more fully described. Said annular rings 25 are formed with lugs or extended ears 27 in which are arranged the pins 28 by means of which the ends of links 29 are pivotally secured to said rings. The other ends of said links 29 are pivotally secured together by pins 30, upon which are pivotally mounted the bushings 31. Said links 29 form toggles which are adapted to be moved into straightened position to cause the engagement of the clutch plates.

Bushings 31 are secured within the hubs 32 of links 33 and the other end of said links 33 have arranged therein the bushings 34 pivoted on pins 35 secured in the lugs 36 of the sleeve 37. Said sleeve 37 is slidably disposed upon the operating shaft 10, and is arranged to be axially moved in one direction to straighten the clutch operating toggles, to thereby cause the engagement of the clutch plates, and to be moved in the opposite direction to break said toggles to cause the disengagement of the plates. Said link 33 is provided with a projection 38 adapted to engage the pressure plate 24 in the fully set condition of the toggles to thereby prevent the over-shooting of the toggles, which would otherwise cause a partial disengagement of the clutch plates.

The sliding sleeve 37 is interiorly formed intermediate its end bearing portions 39 with an oil pocket or reservoir 40 which is in communication with the interior of the case through the opening 41. The end bearing portion 39 exterior of the case is formed with a radially upwardly extended flange 42, rotatably disposed in a groove 43 of a clutch operating ring 44, provided with trunnions 45, by means of which it may be pivotally engaged by the clutch operating lever 46.

An oil duct 47 extends from the oil chamber or reservoir 40 to the junction of the flange 42 and the ring 44, and forms means whereby oil may be conducted from said reservoir to the groove 43. Due to the method of connecting the ring 44 with the sliding sleeve, the oil always tends to remain in the groove 43, being held there by centrifugal force, and thereby the rubbing surfaces of said rings and flange 42 are always lubricated.

The end wall 26 is formed with an annular peripheral flange 48, which is threaded to engage the interiorly threaded portion 49 of the cylindrical portion 12 of the clutch casing. Said end wall 27 is provided with suitable holes 50, which are adapted to be engaged by a suitable spanner wrench to rotate said end wall relative to the casing whereby the position of the toggle relative to the clutch plates may be adjusted to thereby simultaneously and equally adjust the clutch operating members for wear of the clutch plates.

The end wall 26 is adapted to be locked in set position by the check ring 51, which is threaded over said end wall 26, and adapted to engage the end of the cylindrical portion 12 of the clutch casing in the locked condition of the end wall.

Said ring 51 is formed with suitable holes 52 therein for engagement with a spanner wrench whereby said check ring may be rotated. The face of the end portion of the casing and the coöperating face of the ring are adapted to be in oil tight contact in the set position of the ring to thereby seal the casing at the threaded joint against leakage of oil.

The siding sleeve 37 extends through an opening in the end wall, and is arranged to be a sliding fit in said end wall, whereby leakage of oil from the casing is prevented.

The surface 19 of the end wall 13 is formed with two oil ducts or grooves 53, which extend from the inner wall of the cylindrical portion 12 to the center of the casing and terminate in a duct 54 in the bushing 15 and which serve to conduct oil from the inner peripihery of the casing to the bushing 15.

In the clutched condition of the mechanism, in which the casing is rotating, the oil within the casing is maintained, by centrifugal force, against the inner periphery of the casing and thereby in the outer extremities of the oil ducts 53. When the mechanism is set in the unclutched condition, and the casing consequently ceases to revolve, the oil contained in one of said ducts 53 flows down said ducts to the bearing or bushing 15, thereby maintaining said bearing effectively lubricated.

I claim—

1. In a clutching mechanism, a driving element, clutch plates carried thereby, a driven element, clutch plates carried thereby, said clutch plates adapted to be moved into clutching engagement for the conjoint rotation of said elements, an abutment carried by said driven member and spaced from a clutch plate carried by said driven member, said plate and abutment being conjointly rotatable, and operating mechanism for said clutching mechanism including two pressure rings adapted to be moved into engagement with said abutment and clutch plates to connect said driving and driven elements through said clutch plates, and a plurality of toggle links connecting said rings, said pressure rings and toggle links adapted for rotation independent of said driving and driven elements.

2. In a clutching mechanism, a driven member, clutch plates carried thereby, a driving member, clutch plates carried thereby, said clutch plates adapted to be moved into clutching engagement to connect said members together, a fixed annular abutment carried by said driven member, the clutch plates carried by said driven member slidable relative thereto, but fixed against independent rotation, a pressure ring adapted to coöperate with said fixed annular abutment, a second pressure ring adapted to coöperate with the clutch plates carried by said driven member, and mechanism connecting said rings arranged to move said rings against their coöperating elements to cause the clutch plates to engage, said pressure rings and coöperating elements constructed and arranged to be without relative rotation in the engaging movement thereof.

3. In a clutch mechanism, a driven member comprising a clutch-plate inclosing casing, a driving member comprising a shaft, a set of clutch plates carried by said casing, a second coöperating set of clutch plates carried by said shaft, said casing having an end-plate adjustably threaded therein, a floating pressure ring engageable with said end plate, a second floating pressure ring engageable with a clutch plate carried by said casing, toggle mechanism connecting said rings, and operating mechanism for said toggle mechanism extended beyond said casing for engagement with an operating member, said floating rings and associated operating mechanism arranged to be free from driving connection with the clutch mechanism in its unclutched condition.

4. In a clutching mechanism, a driving shaft, clutch plates carried thereby, a driven casing, clutch plates carried thereby, said clutch plates, arranged within said casing, floating pressure rings arranged to engage said casing and a clutch plate carried by said casing to move said clutch plates into clutching engagement, toggle members connecting said rings, a sliding sleeve arranged on said shaft, operating links connecting said sleeve and toggle members, and means carried by said operating links arranged to engage an abutment in the operated position of said links to prevent a movement thereof beyond fully operated position.

5. In a clutching mechanism, a driving shaft, a driven casing adapted to contain oil, clutch plates arranged within said casing, a sliding sleeve arranged on said shaft and extended through and beyond said casing, a flange formed on the extended end thereof and a ring formed with a groove in which said flange is rotatably arranged, said sleeve being formed with an oil duct extended from said flange and communicating with said casing, whereby said ring and flange are lubricated from the oil within said casing.

6. In a clutching mechanism, a driving shaft, a driven casing, clutch plates arranged within said casing operating mechanism therefor including a sliding sleeve arranged on said shaft and extended beyond said casing, said sleeve being formed with an oil reservoir in the body and with a flange on the extended end thereof and with an oil duct between said flange and oil reservoir.

7. A clutch mechanism having a driven member comprising a clutch-plate inclosing casing, a driving member comprising a shaft, a set of clutch-plates carried by said casing, a second coöperating set of clutch-plates carried by said shaft, and clutch-operating mechanism comprising a floating pressure ring engageable with an end wall of the casing, a second floating pressure ring engageable with a clutch plate carried by said casing, toggle members pivotally connecting said rings, a sliding sleeve disposed on said shaft and links pivotally connecting said sleeve and toggle members, said sleeve adapted to be moved along said shaft to move said floating rings into engagement with the end wall of said casing and with a clutch-plate carried by said casing to set the clutch mechanism and said operating mechanism arranged to be free from driving connection with the clutch-mechanism in its unclutched condition.

8. In a clutching mechanism a cylindrical inclosing casing having an interiorly-threaded open end-portion and adapted to contain oil, a plurality of clutch plates, and operating mechanism inclosed within said casing, an exteriorly threaded plate received in the threaded end-portion of said casing and forming a closure for said casing, said plate extended beyond the end of said casing, and an interiorly threaded locking ring threaded on said end plate and engaging the end of said casing, the periphery of said ring and casing arranged substantially to coincide, and the contact faces of said ring and casing arranged for oil tight engagement to prevent leakage of oil from the casing by centrifugal force.

In testimony whereof, I have signed my name to this specification, in the presence of two subscribing witnesses.

HARRIE M. GIFFIN.

Witnesses:
H. B. DAVIS,
T. T. GREENWOOD.